No. 806,103. PATENTED DEC. 5, 1905.
P. BURCHARDT.
CONVEYER.
APPLICATION FILED SEPT. 14, 1904.
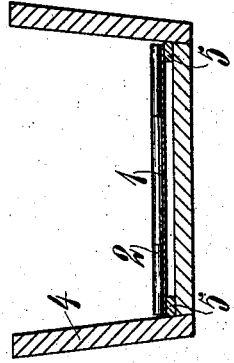
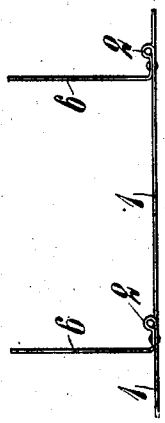
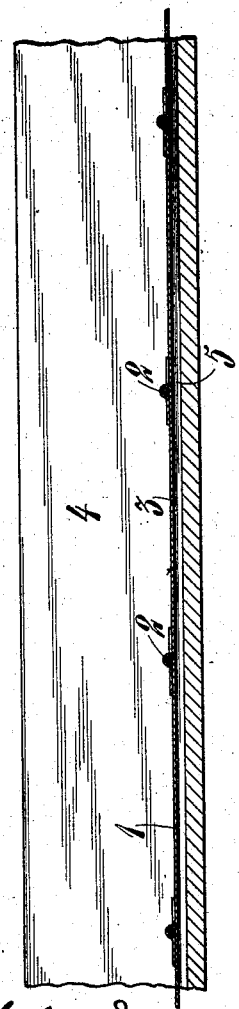
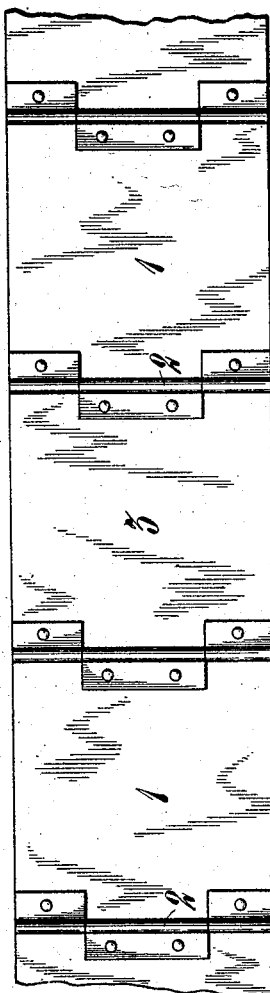
Witnesses
E. O. Hildebrand
M. F. Anderson
Inventor:
Paul Burchardt
By George Massie
His attorney

UNITED STATES PATENT OFFICE.

PAUL BURCHARDT, OF KRAMFORS, SWEDEN.

CONVEYER.

No. 806,103.   Specification of Letters Patent.   Patented Dec. 5, 1905.

Application filed September 14, 1904. Serial No. 224,406.

*To all whom it may concern:*

Be it known that I, PAUL BURCHARDT, a subject of the King of Sweden and Norway, and a resident of Kramfors, in the Kingdom of Sweden, have invented certain new and useful Improvements in Conveyers, of which the following is a specification, reference being had therein to the accompanying drawings.

This invention relates to a conveyer especially adapted for the conveyance of different kinds of waste wood generally found in great quantities in wood-mills. The ordinary conveyers, consisting of a series of boxes, shovels, or the like connected together to form a train or belt, cannot be advantageously used, because the mass does not fall into the boxes or shovels if the latter are not made exceedingly large. Neither the ordinary conveyer-belts, consisting of cotton fabric, india-rubber, leather, or the like, can be used for this purpose, because they are usually damaged by the mass, especially when the latter is wet and full of twigs and other pointed pieces, in which case the belt or band will often be in need of repair, and thus cause great expense. In order to overcome the said inconveniences and reduce to a minimum the cost of establishing and maintaining the conveyer arrangement, the conveyer is composed, according to this invention, of a simple chute having plain inner sides on which the mass can easily glide and of an endless belt forming a movable bottom within the chute, said belt being built up of single wide pieces of sheet metal, forming flat plates connected by suitable hinges one with the other. This belt runs about wheels or rollers of multangular shape corresponding to the length of the separate links.

The invention is illustrated in the accompanying drawings.

Figures 1 and 2 show the belt and chute in longitudinal and transverse section, respectively. Fig. 3 is a top plan view of the belt. Fig. 4 shows a modification.

The wide pieces 1 of sheet metal are connected together one with the other by hinges 2 to form an endless belt 3. Only a short portion thereof is shown in the drawings, nor are the wheels or rollers shown. The latter can obviously be constructed in several ways. For instance, they can be made of a pair of disks threaded on a shaft and connected together by pegs or the like. The chute 4, in which the belt is moving, is suitably provided at the bottom with two or more longitudinal ribs 5 5, of some hard kind of wood for the belt to glide upon. In order to avoid wear, the side of the belt having projections formed by the hinges should be turned upward. In the modification shown in Fig. 4 the sheet-metal pieces are provided at one end with an angular piece 6, so that the belt as a whole will form a series of shovels. This is necessary when the belt is to serve as an elevator; but it can also be used when the belt moves horizontally.

Having now described my invention, what I claim as new, and desire to secure by Letters Patent, is—

1. In a conveyer, the combination, with a chute having a bottom and longitudinal ribs located within said chute and near the bottom thereof, of a belt consisting of a plurality of flat sheet-metal plates hinged together, said belt being movable longitudinally within said chute and bearing on said longitudinal ribs.

2. In a conveyer, the combination, with a chute having closed sides and a bottom, of longitudinal ribs carried by the sides of said chute and near the bottom, and a belt movable longitudinally within said chute and composed of a plurality of sheet-metal plates hinged together, each plate being provided with an upturned integral portion forming an upward-extending shovel, said belt bearing on the longitudinal ribs within the chute.

3. In a conveyer, the combination, with a chute having closed sides and bottom, of longitudinal ribs carried by the sides of said chute and near the bottom thereof, and a belt movable longitudinally within said chute and bearing upon said ribs, said belt being composed of a plurality of sheet-metal plates hinged together, each plate being provided with an upturned end bent to form a hinge portion and an upward-extending shovel.

In witness whereof I have hereunto signed my name, this 3d day of September, 1904, in the presence of two subscribing witnesses.

PAUL BURCHARDT.

Witnesses:
 AXEL PETERS,
 M. AHLSTROM.